United States Patent [19]
Aaland

[11] Patent Number: 5,478,128
[45] Date of Patent: Dec. 26, 1995

[54] CLAMSHELL ACTION POST HOLE DIGGER

[76] Inventor: Hjalmar A. Aaland, 14235 Vanowen St., Apt. 8, Van Nuys, Calif. 91405

[21] Appl. No.: 342,593

[22] Filed: Nov. 21, 1994

Related U.S. Application Data

[63] Continuation-in-part of Ser. No. 154,884, Nov. 17, 1993, abandoned.

[51] Int. Cl.[6] ............................................. A01B 1/18
[52] U.S. Cl. ................................. 294/50.8; 294/116
[58] Field of Search .................... 294/19.1, 50.5–50.9, 294/57, 68.23, 116; 111/101, 106; 175/202, 203

[56] References Cited

U.S. PATENT DOCUMENTS

| | | | |
|---|---|---|---|
| 1,053,730 | 2/1913 | Jensen | 294/50.6 X |
| 1,443,138 | 1/1923 | Littley | 294/50.8 |
| 1,553,270 | 9/1925 | Saffold | 294/50.8 |
| 2,028,680 | 1/1936 | Mayeda et al. | 294/50.8 |
| 2,219,374 | 10/1940 | Spurney | 294/50.7 |
| 2,435,473 | 2/1948 | Sonnenberg | 294/50.8 |
| 2,703,251 | 3/1955 | Green | 294/50.8 |
| 2,710,765 | 6/1955 | Arens | 294/50.6 |
| 2,712,467 | 7/1955 | Rice | 294/50.8 |
| 4,473,248 | 9/1984 | Preradovich | 294/50.8 |

*Primary Examiner*—Johnny D. Cherry
*Attorney, Agent, or Firm*—Richard Slehofer

[57] ABSTRACT

A clam shell action post hole digger includes a pair of opposed movable shovel blades pivotally attached to a cross brace. A combination stationary shaft and an inner movable rod are secured to the cross brace. The rod and shaft each has a handle attached at the upper end to allow the rod to rotate within the shaft by causing the pair of handles to open and close by the user. An eccentric cam plate mounted at the bottom of the rotatable rod causes the pair of shovels to open and close. A spring and pair of locking tangs on the cam plate lock the shovels in the open mode. In an alternate, a locking bar secured to and extending below the cam plate locks the shovels in the open mode. In normal operation the pair of shovels are in the open digging mode. The blade edge on the bottom of each shovel allows the user to form a cylinder-shaped hole by turning and pounding the digger in the ground by gripping and turning the pair of handles. Loosened dirt can be removed by closing the pair of shovels to trap and scoop out the dirt at the bottom of the hole being dug.

6 Claims, 6 Drawing Sheets

CLAMSHELL ACTION POST HOLE DIGGER

CROSS REFERENCE TO RELATED APPLICATIONS

This is a continuation-in-part of application 08/154,884 filed on Nov. 17, 1993, now abandoned.

BACKGROUND OF THE INVENTION

1. Field of the Invention

The present invention pertains to the following areas of technology: Tools and equipment for gardening or for erecting fences.

2. Description of the Prior Art

U.S. Pat. No. 2,710,765 issued on Jun. 14, 1955 to C. A. Arens discloses a post hole digger with a pair of handles to open and close a pair of opposed shovel blades attached to the lower end of the tool.

U.S. Pat. No. 1,443,138 issued on Jan. 23, 1923 to W. Litley discloses a post hole digger with a cam lever on the handle used to actuate the pair of opposed shovel blades attached at the lower end of the tool.

SUMMARY AND OPERATION OF THE INVENTION

The present invention is a clamshell action post hole digger for digging a cylinder-shaped hole in the ground and having the same diameter throughout without the need to enlarge the diameter of the opening of the hole in order to remove the loose dirt and rock formed at the bottom of the hole during the excavation operation.

Two opposed facing shovel blades are demountably attached to the lower end of the tool so that when the pair of transverse handles at the upper end of the tool are in an opposed relationship, the pair of shovel blades will be in the open vertical position and parallel to each other. The pair of shovel blades are configured so that the vertical face is straight and the transverse face is concave to form a concave inner surface for scooping and retaining a quantity of dirt and gravel for removal from the bottom of the post hole being dug.

The bottom cutting edge of each shovel blade is convex-shaped in order to reduce the amount of space between the bottom edges of both shovels when they are closed together during the excavation or the dirt removal step to minimize any loss of dirt. The bottom edge of each shovel blade is sharpened to form a sharp cutting edge to facilitate the cutting, pounding and striking force necessary to cut dirt loose around the circumference of the hole during the excavation process.

By repositioning the present invention and sequentially rotating the pair of shovels about the axis of the tool during the cutting, pounding and striking step, a uniform cylinder-shaped post hole eventually will result. The cutting, pounding, striking and driving step in order to loosen the compacted dirt, soil and gravel in the ground can be accomplished by gripping the pair of vertical handles to deliver a downward force while maintaining the transverse pair of handles in an opposed relationship.

After a sufficient quantity of soil and gravel has been loosened as a result of repeated blows during the cutting, pounding and striking step, the pair of shovel blades can be left at the bottom of the hole and closed to scoop up and capture a quantity of loose soil for removal from the bottom of the hole. The pair of shovel blades can be closed by turning the handle attached to the upper end of the rotatable rod in a counterclockwise direction up to 180 degrees towards the stationary handle until further movement is prevented by the soil caught between the shovel blades. A stop on the inverted T-bar handle on the stationary shaft prevents the movable transverse handle attached to the upper end of the rod from turning more than one half a circle from its at-rest position. After the shovel blades are closed in the hole, the user lifts the tool from the hole and then turns back the movable handle to open the shovel blades to release the soil held in the shovels. The pair of shovel blades are then in the open cutting position to resume the excavation process.

Each one of the pair of shovel blades is demountably attached to the lower end of the tool by a shovel mounting member that is welded to the inside face of each blade and extends above the shoulder of each blade. The mounting member is a flat elongated metal bar. The shovel mounting member is centrally located along the shoulder of each shovel with the elongate and lengthwise orientation of the mounting member in line with the lengthwise symmetrical center of each shovel blade. A sufficient portion of the mounting member is welded to the inside face of the shovel blade to ensure a secure nonbreakable connection. The major portion of the mounting member extends upwards above the shoulder of the shovel. The shovel mounting member used in the alternate of the present invention is illustrated in a perspective view in FIG. 19.

The lower end of the hollow stationary shaft has a pair of L-shaped brackets welded in an opposed relationship to form what can be described as a downward facing U-shaped bracket. The unattached portion of each L-shaped bracket which forms the downward U-shaped portion after both brackets are welded to the shaft has a pair of bars welded on either side to form a downward facing slotted fork. The pair of slotted forks are in an opposed arrangement and are parallel to the axis of the stationary shaft. The fork with the slot is used for receiving the shovel mounting member that extends upward from the shoulder of the shovel. A drill hole is made through the three pieces so that a bolt can be inserted throughout the drill hole to secure the shovel mounting member to the slotted fork. The bolt allows the shovel to swivel inwardly and outwardly at this point to allow the pair of shovels to close together to scoop up the dirt during the dirt removal step. The pair of shovels are always locked in the open digging mode unless the user wants to remove a quantity of dirt from the bottom of the excavation hole.

The pair of shovel blades can be closed together to scoop up the dirt by the rotation of an eccentric cam plate mounted at the lower end of the rotatable rod. The cam plate is positioned transversely between both of the shovel mounting members at a location above the swivel bolts. The shovel mounting members serve as pressure points for receiving the force exerted by the eccentric cam plate when the cam plate is rotated by the rod. The shovel mounting members are considerably wider than the slotted forks between which the shovel mounting members are positioned. The shovel mounting members are positioned so that the inner edge of each mounting member extends beyond the inner edge of each slotted fork. With this arrangement, the cam plate can exert force against both shovel mounting members without rubbing against either slotted fork.

The eccentric cam plate is positioned on the tool to exert force against the shovel mounting member above the hinge points in order to provide the necessary mechanical advantage to easily move the pair of shovel blades towards each other during the shovel closing operation. When the force exerted by the cam plate is released by turning the movable upper handle back to the original opposed relation with the stationary handle, the shovels will return to their normal full open position. A coil spring mounted below the cam plate and spanning the distance between the pair of opposed shovel mounting members causes the shovels to return to their open position. The spring has hooks at both ends which are located in a pair of small holes in both of the shovel mounting members. The distance between the pair of small holes and the length of the coil spring is such that the spring is always stretched and tensioned. The spring is secured above the swivel points to supply the necessary centripetal force to maintain the pair of shovel blades in the open position.

The tool handles may be constructed from round, square, or other tubing or bar stock. The stationary shaft must have a cylindrical bore therethrough to allow the rod to rotate therein. One horizontal handle is attached to the upper end of the rod. The other horizontal handle is attached to the stationary shaft at a location below the upper end of the stationary shaft to allow sufficient clearance between the handles when the handles are turned towards each other during the shovel closing operation so that the user's hands and fingers will not be pinched or otherwise injured during the closing operation. The handles can be covered with plastic or rubber grips to cushion the shock during the digging operation.

The eccentric cam plate is demountably attached to the lower end of the rod. The upper face of the cam plate has a centrally located cylinder projection for receiving the end of the rod. A pin or bolt is passed through a transverse diametral hole in the rod and the cylinder projection to secure the cam plate to the rod.

The inverted U-shaped cross brace on the stationary handle has a pair of cam arresters that hold the shovel mounting members away from the edge of the cam plate when the pair of shovels are in the open and locked position. During the closing operation, the cam plate must turn about 30 degrees before it begins to engage the inside edges of the shovel mounting members. This allows the user to gain momentum while turning the movable handle before the closing action begins. This results in less stress to the user's arms and hands. The 30 degree delay allows the user a running start before any resistance is encountered when closing the shovel blades. The arcuate edges of the cam plate continuously taper from a generally vertical flat edge at the beginning of the arcuate edge to a beveled edge that becomes more pronounced at the end of the arc where the maximum inward tilting of the shovels occurs during the shovel closing operation. The variable beveled edge maintains a flush contact between the arcuate beveled edge on the cam plate and the facing edge of the shovel mounting member as the member swivels away from the center of the cam plate during the closing operation. The demountable cam plate and the pair of shovels allow for easy assembly and disassembly of the tool. Broken parts can be easily replaced.

In the alternate, the cam plate has an inverted T-shaped locking bar extending below the cam. The cam plate and the locking bar are one-piece and rotate in unison. The locking bar functions as a positive locking mechanism to maintain the shovel blades in the open position. This is necessary when the invention is being used in hard or rocky soil. The shovel blades tend to deflect in this type of soil.

DETAILED DESCRIPTION OF THE PREFERRED EMBODIMENT

The present invention, which is clearly illustrated in FIGS. 1–10, will now be discussed in greater detail. The present invention is a clamshell action post hole digger. The following components comprise the present invention: An outer hollow stationary shaft 10 having a welded cross brace 15 at its lower end and an inverted T-bar handle 20 at its upper end; a rotatable rod 25 positioned in the hollow shaft 10 and having a movable transverse handle 30 at its upper end and a linkage 35 at its lower end; a pair of opposed shovel blades 100 and 105 each having a shovel mounting member 110 and 115 to attach the upper end of the shovel to the welded cross-brace 15 at the lower end of the shaft 10; an eccentric cam plate 200 attached to the lower end of the rod 25; a coil spring 40 to keep the pair of shovel blades 100 and 105 in the open digging position; and a lock 22 at the upper end of the hollow shaft to lock the movable handle 30 on the rod 25 in place when the present invention is used in the digging mode.

The hollow tubular outer shaft 10 is about 35" in length with a 1" outside diameter. The shaft 10 has a bore therethrough having a diameter of about ⅝". The inner rotatable rod 25 can be solid and is about ⅝" in diameter and about 36" in length. The rod is visible in FIG. 1 where it extends below the end of the shaft. The rotatable rod 25 fits snugly in the bore of the outer shaft 10. The rod must be rotatable in the bore of the stationary shaft 10. The rod 25 extends slightly beyond both ends of the shaft 10. The upper end of the rod has an inverted movable T-bar handle 30 attached to it in a transverse position. The lower end of the rod that extends beyond the end of the shaft has a place for centrally mounting the eccentric cam plate 200 to it. The upper end of the hollow shaft 10 has an inverted T-bar handle 20 welded to it in a transverse position. An arm 21 with a retaining clip 22 is also welded to the hollow shaft 10 and is located 180 degrees opposite to and in a radial position relative to the inverted T-bar handle 20 mounted on the opposite side of the shaft. The inverted T-bar handle 20 and the movable handle 30 are in an opposed relationship when the present invention is in the digging mode. The digging mode is clearly illustrated in FIG. 1.

The lower end of the hollow shaft 10 has a pair of opposed L-shaped brackets 50 and 55 welded transversely to the outside of the hollow shaft 10. Together they form part of the cross brace 15. They form an inverted U-shaped cross brace after they are welded in place. The unattached portion of each L-shaped bracket has a slotted fork 60 and 65 aligned parallel to the axis of the shaft 10. Each slotted fork 60 and 65 is formed by a pair of opposed elongate rectangular pieces of metal welded to each end of the cross brace 15. The gap formed in the fork 60 or 65 allows the shovel blade mounting member 110 of the shovel 100 and the mounting member 115 of the shovel 105 to closely fit therein and to be secured to the fork 60 with a hinge pin means such as a nut 130 and bolt 135. The hinge pin forms a hinge joint to allow both mounting members 110 and 115 to turn in the same plane. The hinge joint allows the pair of shovel blades 100 and 105 to tilt inwardly towards the axis of the post hole digger when the tool is in the dirt removing mode. This is clearly illustrated in FIG. 5.

Figure 1:
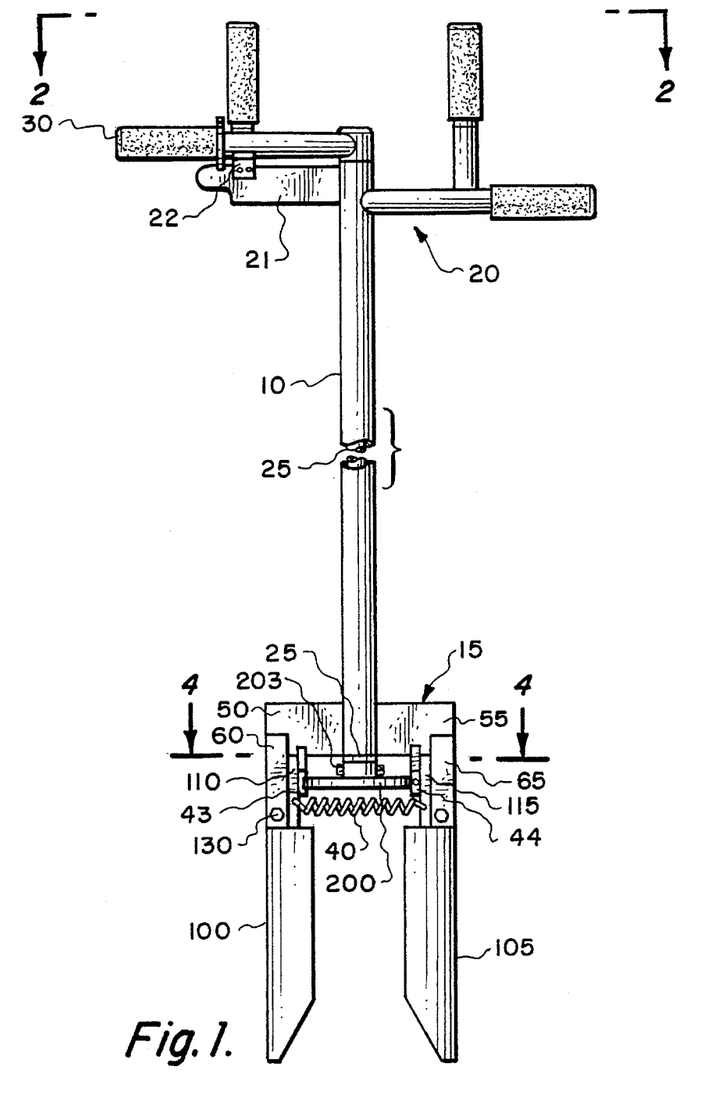
FIG. 1 is a front elevational view of the present invention in the open digging mode and with the shaft shown in a fragmentary view.
Figure 2:
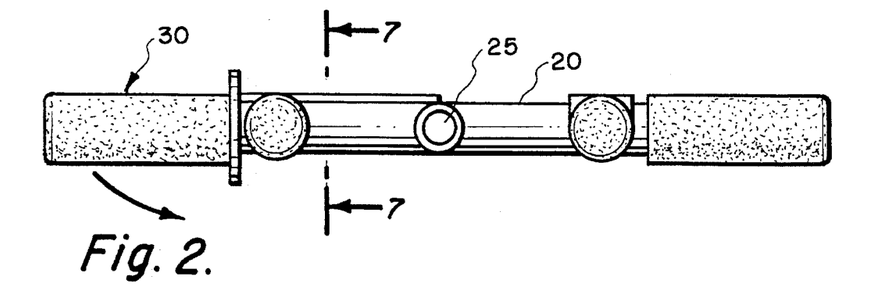
FIG. 2 is a top plan view of the present invention relative to FIG. 1 with the pair of opposed shovel blades in the open and locked digging mode.
Figure 3:
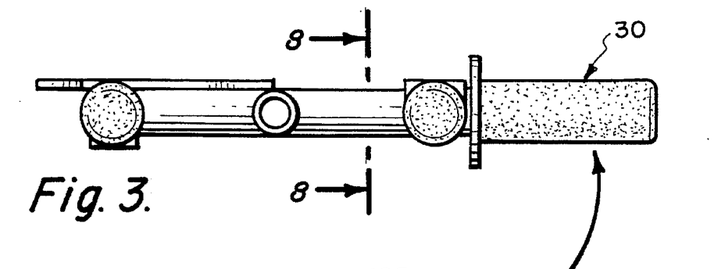
FIG. 3 is a top plan view of the present invention showing the movable handle in the closed position with the pair of shovel blades in the closed dirt removing mode.
Figure 4:
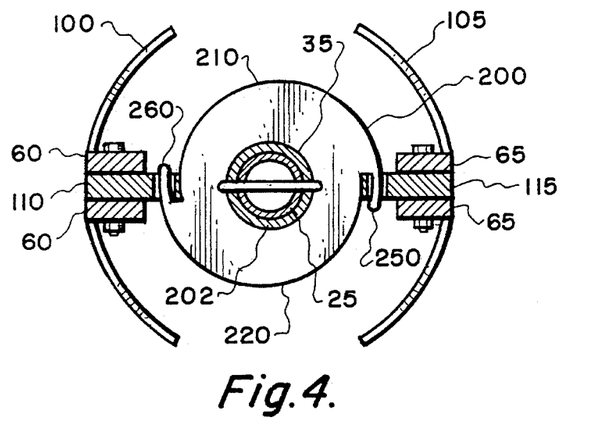
FIG. 4 is a transverse sectional view taken along the line 4—4 in FIG. 1 illustrating the cam plate with the pair of opposed shovel blades in the open digging mode.
Figure 5:
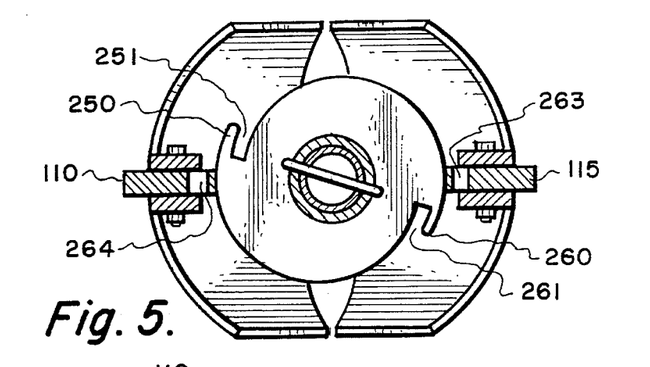
FIG. 5 is a is a transverse sectional view taken identical to line 4—4 in FIG. 1 illustrating the cam plate with the pair of opposed shovel blades in the closed dirt removal mode.
Figure 6:
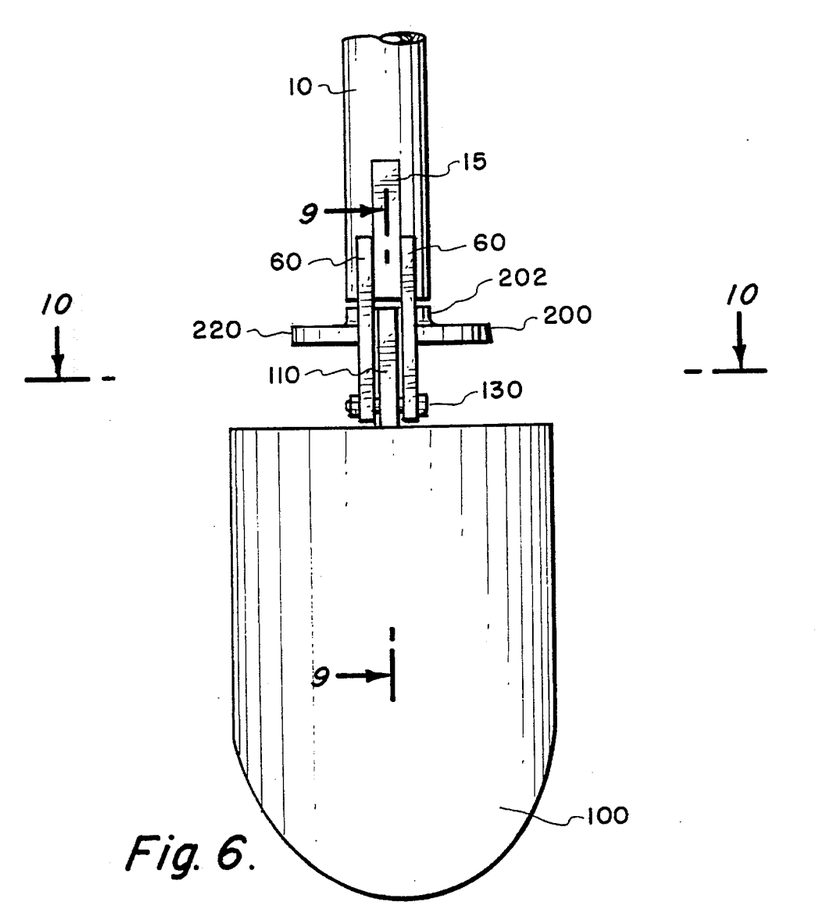
FIG. 6 is a side elevational view relative to FIG. 1 illustrating the outside of one shovel blade, the mounting bracket, the cam plate and the lower portion of the stationary shaft.
Figure 7:
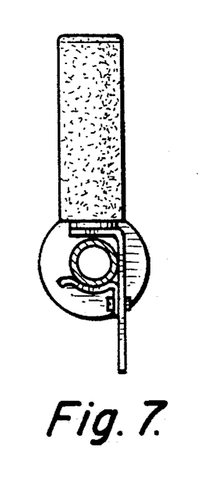
FIG. 7 is a transverse sectional view of the movable handle in the locked position during the digging mode and taken along line 7—7 in FIG. 2.
Figure 8:
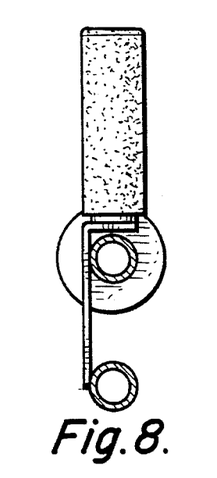
FIG. 8 is a transverse sectional view of the movable handle in the open position during the dirt removal mode.
Figure 9:
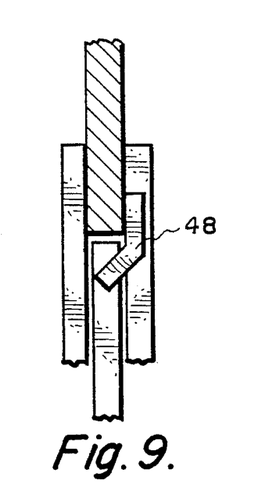
FIG. 9 is a vertical sectional view taken along the line 9—9 of FIG. 6, and illustrating the cross-brace, one of the slotted forks welded to the end of the cross-brace, and the shovel blade mounting member.

Each forked slot 60 and 65 is used for receiving each shovel mounting member 110 and 115 that extends upward from each shovel blade 100 and 105. A drill hole is made through the three metal bars so that the nut 130 and bolt 135 can be inserted in the drill hole to secure each shovel mounting member 110 and 115 to the slotted forks 60 and 65. The bolt 135 allows the shovel blade to swivel inwardly and outwardly in the same plane at this point to allow the pair of shovel blades to close together to scoop up the dirt during the dirt removal step; otherwise the pair of shovels are normally locked in the open cutting mode as is illustrated in FIGS. 1 and 4.

The pair of shovel blades 100 and 105 are caused to move towards each other to scoop up the dirt by means of the eccentric cam plate 200 mounted at the lower end of the rotatable rod 25. The cam plate 200 is positioned transversely between both of the shovel mounting members 110 and 115 at a location above the hinge bolt 135. The shovel mounting members 110 and 115 serve as pressure points for receiving the force exerted by arcuate edges 210 and 220 on the eccentric cam plate when the cam plate 200 is rotated by the rod 25. The shovel mounting members 110 and 115 are considerably wider than the slotted forks 60 and 65 between which the shovel mounting members are positioned. The shovel mounting members 110 and 115 are installed so that the inner edge of each mounting member sits well inside the inner edge of each slotted forks 60 and 65. This allows space for the cam edges 210 and 220 to exert force against the shovel mounting members 110 and 115 without rubbing against either slotted fork 60 or 65.

The eccentric cam plate 200 has a center cylinder projection 202 extending from its upper face. The lower end of the rod 25 fits into this projection. A diametral hole is drilled through both the projection 202 and the rod 25 so that a fastener 203 of some type can be placed in the drill hole to hold the cam to the end of the rod 25 and to force the cam 200 to turn when the rod is turned. The cam plate can be fabricated from a circular metal disc. The disc is cut along a diameter to form a pair of hemicircular halves. One halve is slid sideways and then welded to the other halve. Slots are then cut where the edges are exposed at either side of the cam plate. The slots form two locking tangs 250 and 260. The pair of arcuate edges 210 and 220 are then machined so that the edge is vertical at each tang 250 and 260 and then becomes increasingly beveled until it reaches the end of each tang 250 and 260. The beveled edge of the cam plate is clearly illustrated in FIG. 6.

The eccentric cam plate 200 is positioned to exert force against the shovel mounting members at a point sufficiently above the hinge pins in order to provide the necessary mechanical advantage to easily cause the pair of shovel blades 100 and 105 to move toward each other during the shovel closing operation. The mounting members tilt outwardly in response to the arcuate edges of the cam plate pressing against them. When the force exerted by the cam plate is released by turning the movable handle 30 back to an opposed relation, the shovels will return to their normal full open position.

Figure 10:
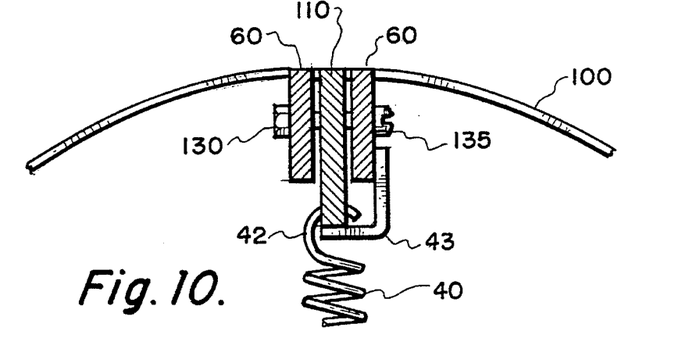
FIG. 10 is a transverse sectional view taken along the line 10—10 in FIG. 6 and illustrating the shoulder of one shovel, one of the slotted forks, and the shovel blade mounting member fastened in the slotted fork.

The coil spring 40 mounted below the cam plate 200 and spanning the distance between the pair of opposed shovel mounting members 110 and 115 causes the shovels to return to their open position. The spring has a hook at either end. Each hook 42 is placed in a small hole in the shovel mounting member. The drill hole is located above the hinge pin 135. The distance between the pair of small holes and the length of the coil spring 40 is such that the spring is always tensioned. The spring 40 is secured above both hinge points to supply the necessary force to maintain the pair of shovel blades 100 and 105 in the open position. The hook 42 at one end of the spring 40 is engaged with the small hole in one of the shovel mounting members 110 as illustrated in FIG. 10. The spring 40 is then stretched until the other hook 42 engages the small hole in the other opposite shovel mounting member 115. Also illustrated in FIG. 10 is the downward U-shaped cross brace 15 having a cam action arrester 43 that maintains the shovel mounting member slightly away from the edge of the cam plate when the pair of shovels are in the open and locked position. The other cam arrester 44 is located in a symmetrical opposed relationship to cam arrester 43. A pair of tabs 48 extend downward from the cross brace to keep the cam plate in a transverse position. During the closing operation, the cam plate has to turn about 30 degrees before it begins to touch the edge of the shovel mounting member. This allows the user to build up torque while turning the movable handle before the closing action begins. This results in less stress to the user's arms and hands. The 30 degree delay gives the user a running start before any resistance is met while closing the shovel blades.

At each end of the arcuate edges 210 and 220 of the cam plate 200, a locking tang 250 and 260 is formed as a result of the edge cutting into the cam plate. Each locking tang 250 and 260 with the adjacent slot 251 and 261 fit into hole 263 and 264 drilled into each of the shovel mounting members so that the pair of tangs 250 and 260 fit into the holes on the shovel mounting members to lock both of the shovels in the open position. The cam has to be rotated 15 degrees before the tangs will release themselves from the shovel mounting members. This combination along with the tension spring comprises the locking means to keep the pair of shovels in the open position. The tension spring 40 and the tangs 250 and 260 on the cam plate 200 are intended to prevent the pair of shovel blades from deflecting when the present invention is used in the digging mode.

The alternate of the present invention, which is clearly illustrated in FIGS. 11–20, will now be discussed in greater detail. The alternate of the present invention is a clamshell action post hole digger. The following components comprise the alternate of the present invention: An outer hollow stationary shaft 11 having a welded cross brace 16 at its lower end and an inverted T-bar handle 19 at its upper end; a rotatable rod 26 positioned in the hollow shaft 11 and having a movable transverse handle 31 at its upper end and a linkage 204 at its lower end; a pair of opposed shovel blades 101 and 106 each having a shovel mounting member 111 and 116 to attach the upper end of the shovel to the welded cross-brace 16 at the lower end of the shaft 11; an eccentric cam plate 201 attached to the lower end of the rod 26; a coil spring 41 to keep the pair of shovel blades 101 and 106 in the open digging position; and a lock 23 at the upper end of the hollow shaft to lock the movable handle 31 on the rod 26 in place when the present invention is used in the digging mode.

The hollow tubular outer shaft 11 is about 34" in length with a 1" outside diameter. The shaft 11 has a bore therethrough having a diameter of about ⅝". The inner rotatable rod 26 can be solid and is about ⅝" in diameter and about 36" in length. These dimensions are for illustrative purposes only, and it is to be understood that the dimensions can be large or smaller. The rod is just slightly visible in FIG. 11 where it extends below the end of the shaft 11. The rotatable rod 26 fits snugly in the bore of the outer stationary shaft 11. The rod must be rotatable in the bore of the stationary shaft 11. The rod 26 extends slightly beyond both ends of the shaft 11. The upper end of the rod has an inverted movable T-bar handle 31 attached to it in a transverse position. An adjunct handle 18 is rigidly fixed to the handle 19. The angle between the adjunct handle 19 and the movable handle 31 allows for better leverage by the user's arms when the shovel blades are being closed. The lower end of the rod that extends beyond the end of the shaft 11 has a place for centrally mounting the eccentric cam plate 201 to it. The upper end of the hollow shaft 11 has an inverted stationary T-bar handle 19 welded to it in a transverse position. An arm 22 with a retaining clip 23 is also welded to the hollow shaft 11 and is located 180 degrees opposite to and in a radial position relative to the inverted T-bar handle 19 mounted on the opposite side of the shaft. The inverted T-bar handle 19 and the movable handle 31 are in an opposed relationship when the present invention is in the digging mode. The digging mode is clearly illustrated in FIG. 11.

The lower end of the hollow shaft 11 has a cross brace 16 transversely welded to it. Each end of the cross brace 16 has a slotted fork 61 and 66 aligned parallel to the axis of the shaft 11. Each slotted fork 61 and 66 is formed by a pair of opposed elongate rectangular pieces of metal welded to each end of the cross brace 16. The gap formed in the fork 61 or 66 allows the shovel blade mounting member 111 of the shovel 101 and the mounting member 116 of the shovel 106 to closely fit therein and to be secured to the fork 61 and 66 with a hinge pin means such as a nut and bolt 131. The hinge pin forms a hinge joint to allow both mounting members 111 and 116 to turn in the same plane. The hinge joint allows the pair of shovel blades 101 and 106 to tilt inwardly towards the axis of the post hole digger when the tool is in the dirt removing mode. This is clearly illustrated in FIG. 18.

Figure 11:
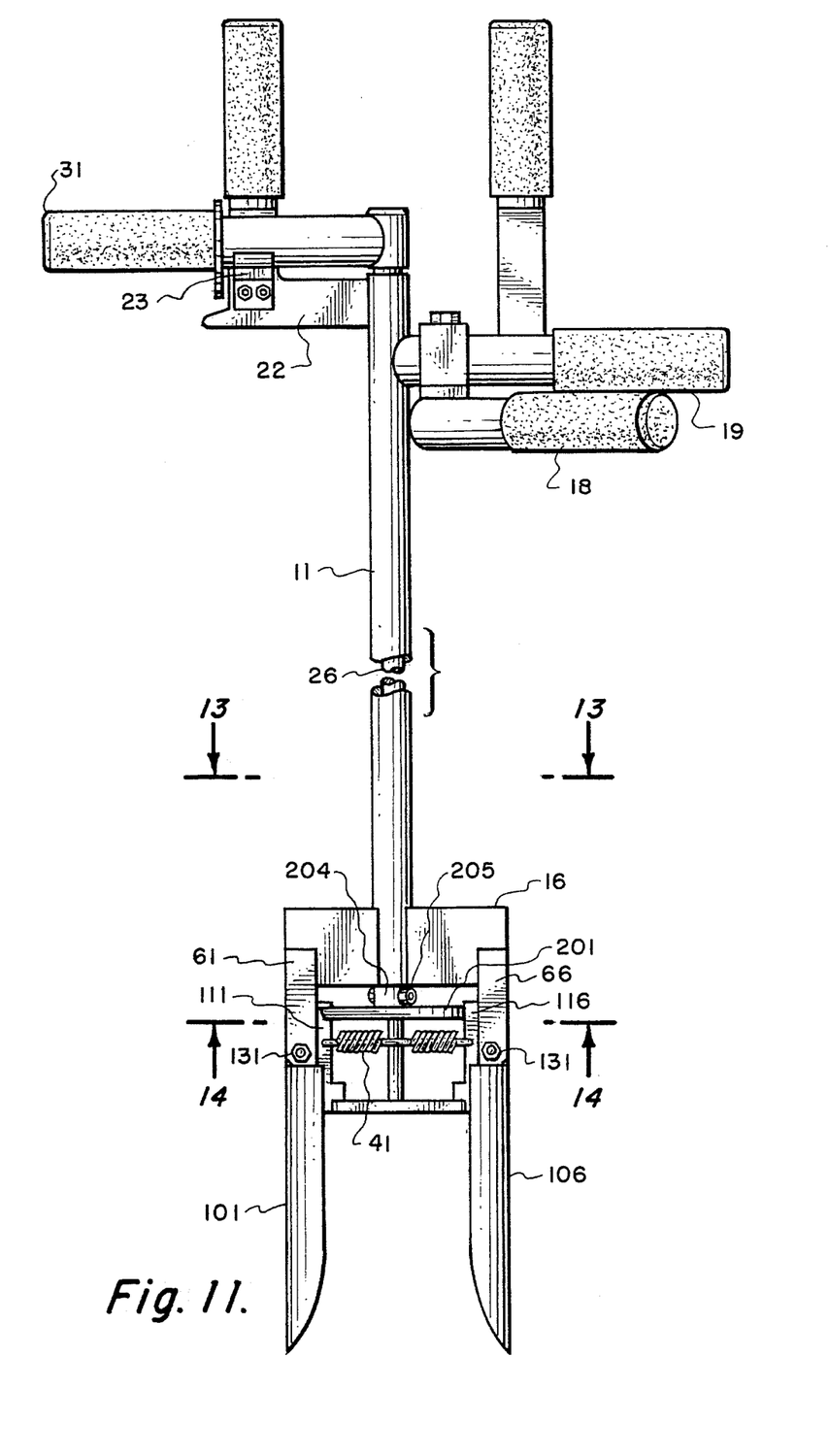
FIG. 11 is a front elevational view of an alternate of the present invention in the open digging mode and with the shaft shown in a fragmentary view.
Figures 12, 13, 14, 15, 16:
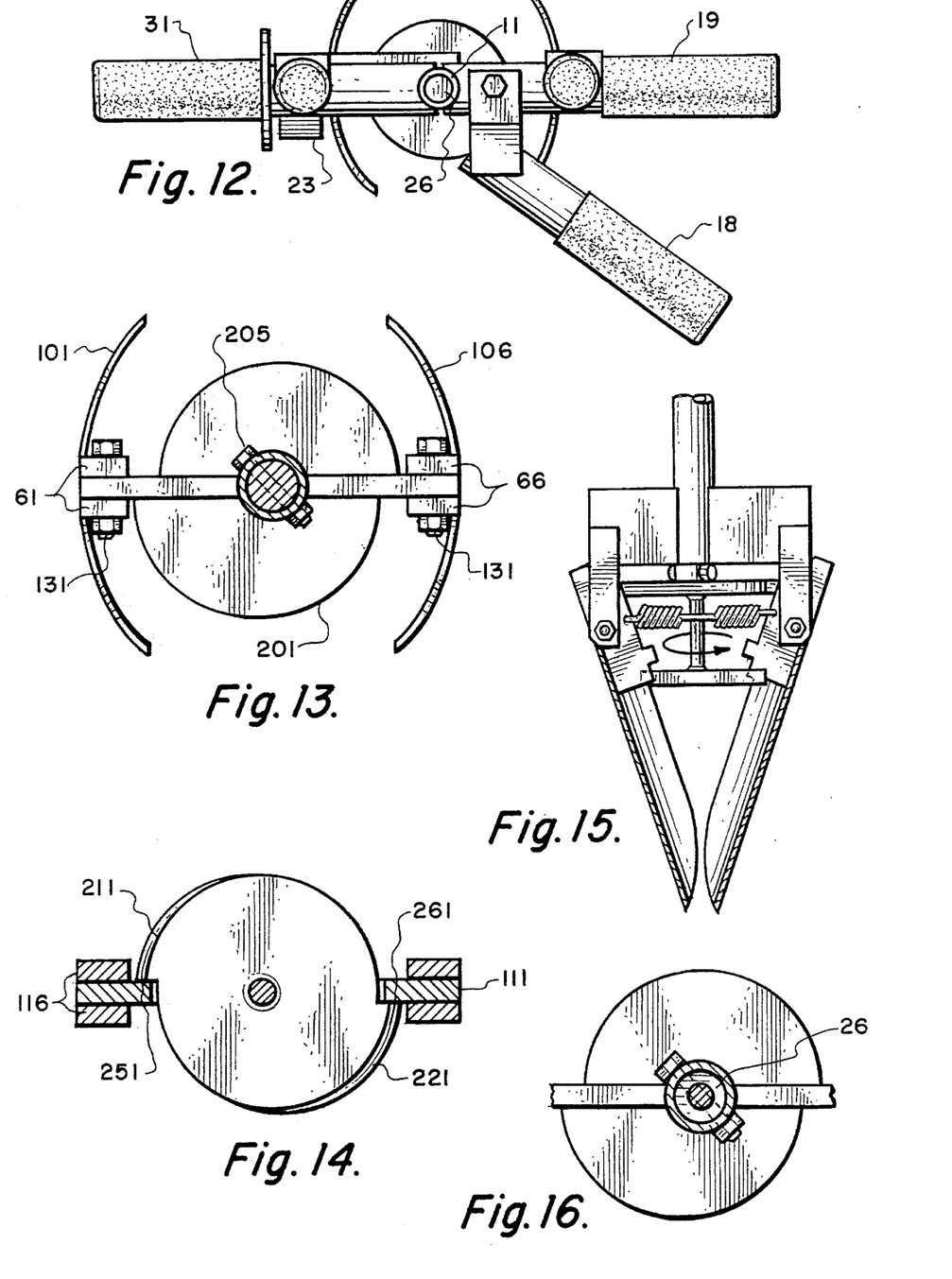
FIG. 12 is a top plan view of the alternate of the present invention relative to FIG. 11 with the pair of opposed shovel blades in the open and locked digging mode.
FIG. 13 is a transverse sectional view taken along the line 13—13 in FIG. 11 illustrating the top of the cam plate with the pair of opposed shovel blades in the open digging mode.
FIG. 14 is a transverse sectional view taken along the line 14—14 in FIG. 11 illustrating the bottom of the cam plate and the beveled edges on the cam plate.
FIG. 15 is a front elevational view of the lower portion of the alternate of the present invention illustrating the pair of opposed shovel blades in the closed dirt holding and removal mode with the pair of opposed shovel blades in a partial cutaway view.
FIG. 16 is a partial fragmentary transverse sectional view similar to FIG. 13, except where the inner rod is hollow rather than solid as shown in FIGS. 13 and 14.
Figures 17, 18, 19, 20:
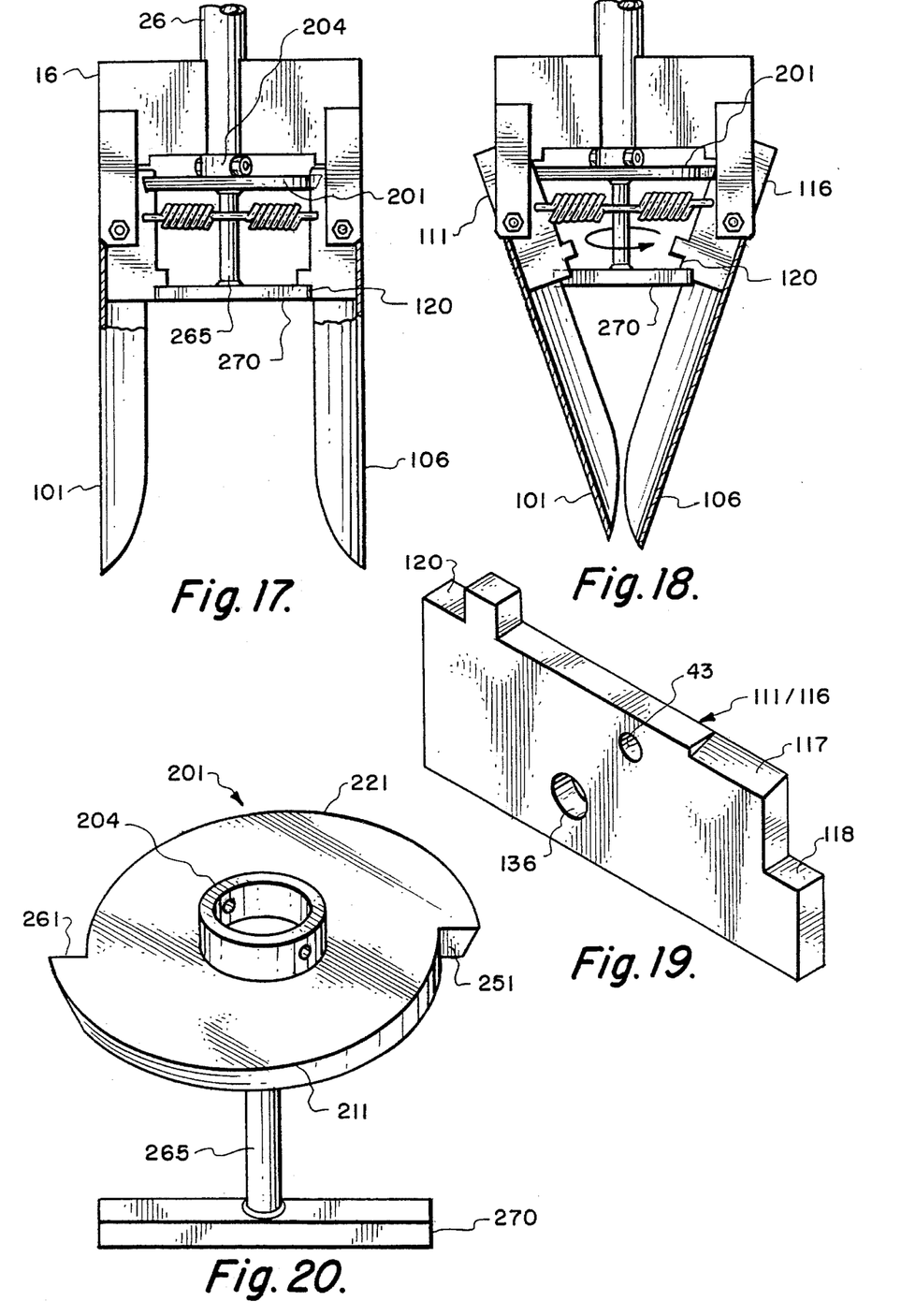
FIG. 17 illustrates the lower portion of the alternate of the present invention in the open digging mode with the top of each shovel blade exposed in a cutaway view with the bar maintaining the pair of shovel blades in the open and locked position.
FIG. 18 is a front elevational view of the lower portion of the alternate of the present invention illustrating the pair of opposed shovel blades in the closed dirt holding and removal mode with the pair of opposed shovel blades exposed in a cutaway view with the bar in non-locked position.
FIG. 19 illustrates the shovel mounting member detached from the shovel blade, with the beveled edge and the stop means.
FIG. 20 illustrates the combination cam plate and shovel locking bar.

Each slotted fork 61 and 66 is used for receiving each shovel mounting member 111 and 116 that extends upward from each shovel blade 101 and 106. A drill hole is made through the three metal bars so that the nut and bolt 131 can be inserted in the drill hole to secure each shovel mounting member 111 and 116 to the slotted forks 61 and 66. The nut and bolt 131 allows the shovel blade to swivel inwardly and outwardly in the same plane at this point to allow the pair of shovel blades to close together to scoop up the dirt during the dirt removal step; otherwise the pair of shovels are normally locked in the open cutting mode as is illustrated in FIGS. 11 and 17.

The pair of shovel blades 101 and 106 are caused to move towards each other to scoop up the dirt by means of the eccentric cam plate 201 mounted at the lower end of the rotatable rod 26. The combination cam plate and locking bar are illustrated separated from the tool in FIG. 20. The cam plate 201 is positioned transversely between both of the shovel mounting members 111 and 116 at a location above the hinge nut and bolt 131. Each shovel mounting member 111 or 116 is illustrated in FIG. 19 positioned on its side. Each member is welded to the inside of the shovel blade. The member has a beveled portion 117 which functions as a pressure point, or sliding joint for receiving the force exerted by arcuate edges 211 and 221 on the eccentric cam plate when the cam plate 201 is rotated by the rod 26. The shovel mounting members 111 and 116 are considerably wider than the slotted forks 61 and 66 between which the shovel mounting members are positioned. The shovel mounting members 111 and 116 are installed so that the inner edge of each mounting member sits well inside the inner edge of each slotted fork 61 and 66. This allows space for the cam edges 211 and 221 to exert force against the shovel mounting members 111 and 116 without rubbing against either slotted fork 61 or 66.

The eccentric cam plate 201 has a center cylinder projection 204 extending from its upper face. The lower end of the rotatable rod 26 fits into this projection. A diametral hole is drilled through both the projection 204 and the rod 26 so that a fastener 205 of some type can be placed in the drill hole to hold the cam plate to the end of the rod 26 and to force the cam plate 201 to turn when the rod is turned. The cam plate can be fabricated from a circular metal disc of about a ½ inch thick. The disc is cut along a diameter to form a pair of hemicircular halves. One halve is slid sideways and then welded to the other halve. The pair of arcuate edges 211 and 221 are machined so that the face of the edge is vertical at each stop 251 and 261 and then becomes increasingly beveled until they reach the end of each stop 261 and 251 respectively. The beveled faces of the edges of the cam plate are clearly illustrated in FIGS. 14 and 20. The beveled face of the edge 211 is clearly illustrated in FIG. 20. The face of the edge 211 is vertical where the edge starts at the stop 251. The face of the edge 211 then becomes increasingly beveled until the edge 211 ends at the stop 261. The face of edge 201 is vertical where it starts at stop 261 and then the face becomes increasingly beveled until the edge 201 ends at the stop 251.

The eccentric cam plate 201 is positioned to exert force against the shovel mounting members at a point sufficiently above the hinge pins in order to provide the necessary mechanical advantage to easily cause the pair of shovel blades 101 and 106 to move toward each other during the shovel closing operation. The shovel mounting members 111 and 116 tilt outwardly in response to the arcuate edges 211 and 221 of the cam plate 201 pressing against them. When the force exerted by the cam plate is released by turning the movable handle 31 back to an opposed relation, the shovel blades will return to their normal full open position.

The coil spring 41 mounted below the cam plate 201 spans the distance between the pair of opposed shovel mounting members 111 and 116, and causes the shovel blades to return to their open position. The spring has a hook at both ends. Each hook is placed in a small hole 43 in the shovel mounting member 111 or 116. The hole 43 is located above the hinge pin hole 136. The distance between the pair of small holes and the length of the coil spring 41 is such that the spring 41 is always tensioned. The spring 41 is secured above both hinge points to supply the necessary force to maintain the pair of shovel blades 101 and 106 in the open position. The hooked ends of the spring 41 engage the smaller holes 43 in each of the shovel mounting members 111 and 116 as illustrated in FIGS. 17 and 18. The spring 41 is then stretched until the other hooked end engages the small hole 43 in the other opposite shovel mounting member 111 or 116.

At each end of the arcuate edges 211 and 221 of the cam plate 201, stops 251 and 261 are formed as a result of the offset arcuate edges on the cam plate. Each stop 251 and 261 abut against the shovel mounting member where the beveled edge 117 abuts 251 and 261 of the cam plate. The stops limit the travel of the cam plate. The cam plate has to be rotated 15 degrees before the unlocking stage begins. The locking bar 270 extends from below the cam plate 201. An axial rod 265 maintains the locking rod 270 in a fixed relationship with cam plate. The ends of the locking bar are radially aligned with the stops 251 and 261 on the cam plate. In the open digging position illustrated in FIG. 17, the locking bar 270 forms a positive locking action between the lower ends of the shovel mounting members 111 and 116. The ends of the locking bar abut against the L-shaped notch 120 formed at the lower end of the shovel mounting member. When the shovels are closed, the locking bar is positioned away from the shovel mounting members as illustrated in FIG. 18.

While the present invention has been shown and described herein in what is conceived to be the best mode contemplated, it is recognized that departures may be made therefrom within the scope of the invention which is therefore not to be limited to the details disclosed herein, but is to be afforded the full scope of the invention.

I claim:

1. Clamshell action Post Hole Digger comprising:

a stationary hollow shaft having an upper end and a lower end;

support bracket means mounted at said lower end of said stationary shaft for mounting a pair of spaced apart opposed shovel blades;

a pair of opposed facing shovel blades hingedly and symmetrically mounted to said support bracket means;

stationary handle means mounted at said upper end of said stationary hollow shaft for allowing the user to hold and manipulate said post hole digger;

a rotatable rod having an upper end and a lower end positioned in said hollow shaft and being slightly longer than said hollow shaft;

movable handle means mounted to said upper end of said rod for allowing the user to hold the post hole digger and to act as a handle to open and close said shovel blades by pivotally turning said movable handle means;

eccentric cam means centrally mounted to said lower end of said rod for closing and opening said pair of opposed shovel blades in response to the user pivotally turning said movable handle means attached to said upper end of said rod; means for mounting said pair of opposed shovel blades to said support bracket means;

biasing means for keeping said opposed facing shovel blades open unless closed in response to said eccentric cam means being rotated by turning said handle means at said upper end of said rotatable rod; and locking means on said eccentric cam means and locking means on said means for mounting said shovel blades to said bracket means for locking said pair of opposed shovel blades in the open position to prevent deflection of said opposed shovel blades during the digging operation.

2. The clamshell action post hole digger as recited in claim 1 wherein:

said locking means on said eccentric cam means includes a pair of tang locks;

said locking means on said shovel blade mounting means includes a receiving hole for one of said tang locks.

3. The clamshell action post hole digger as recited in claim 2 wherein said means for mounting each said opposed shovel blade to said support bracket means includes:

an elongate metal bar having a lower portion and an upper portion and a lengthwise short edge;

said lower portion of said lengthwise short edge of said bar welded to the inside face of said shovel blade;

said upper portion of said metal bar having an upper hole, a middle hole, and a lower hole aligned lengthwise;

said lower hole for connecting said bar to a slotted fork on said support bracket means;

a hinge pin means passed through said lower hole and said slotted fork for allowing said shovel blade to tilt back and forth in a plane;

said biasing means comprises a tension spring having at least one hooked end;

said middle hole in said bar for receiving said hooked end of said tension spring; and said upper hole for receiving said tang lock on said eccentric cam means.

4. Clamshell action Post Hole Digger comprising:

a hollow shaft having an upper end and a lower end;

bracket means at said lower end of said shaft for mounting a pair of shovel blades;

a pair of shovel blades mounted to said bracket means;

handle means mounted at said upper end of said hollow shaft for allowing the user to hold and manipulate said post hole digger;

a rotatable rod having an upper end and a lower end positioned in said hollow shaft;

handle means at said upper end of said rod for allowing the user to open and close said shovel blades by turning said handle means;

eccentric cam means mounted at said lower end of said rod for closing and opening said pair of shovel blades in response to the user turning said handle means;

means for mounting said pair of shovel blades to said bracket means;

biasing means for keeping said pair of shovel blades open unless closed in response to said eccentric cam means being rotated by turning said rotatable rod; and means for locking said pair of shovel blades in the open position to prevent deflection of said shovel blades during the digging operation.

5. The device as recited in claim 4 wherein said means for locking said pair of shovel blades in the open position includes a locking bar.

6. The device as recited in claim 4 wherein said means for mounting the shovel blades is a rectangular-shaped bar having a notch and a portion of one edge beveled.

* * * * *